United States Patent [19]

Thomas

[11] Patent Number: 4,887,653
[45] Date of Patent: Dec. 19, 1989

[54] POWER TOOL ATTACHMENT FOR TABLE SAWS

[76] Inventor: Alvin R. Thomas, Rte. 1, Box 360, Troutville, Va. 24175

[21] Appl. No.: 267,259

[22] Filed: Nov. 4, 1988

[51] Int. Cl.$^4$ .................... B27C 9/02; B27H 1/00
[52] U.S. Cl. .................... 144/286 R; 83/477.2; 144/1 R; 144/287
[58] Field of Search .................... 83/477.2, 478, 648, 83/701; 144/286 R, 286 A, 287, 1 R

[56] References Cited

U.S. PATENT DOCUMENTS

| | | |
|---|---|---|
| 237,475 | 2/1881 | Bragg. |
| 557,222 | 3/1896 | Parks. |
| 1,030,598 | 6/1912 | Miller. |
| 2,916,063 | 12/1959 | Boekenkamp .................... 144/136 R |
| 2,974,696 | 3/1961 | Dorsey et al.. |
| 3,342,226 | 9/1967 | Marcoux et al. .................... 144/286 R |
| 3,695,189 | 10/1972 | Felder, Jr. .................... 144/287 |
| 3,734,151 | 5/1973 | Skripsky. |
| 4,106,381 | 8/1978 | Kreitz .................... 83/477.2 |
| 4,209,045 | 6/1980 | Bassett .................... 144/286 R |
| 4,265,283 | 5/1981 | Nash et al. .................... 144/286 R |
| 4,265,284 | 5/1981 | Taylor .................... 144/287 |
| 4,350,193 | 9/1982 | McCambridge et al. .................... 144/286 R |
| 4,741,370 | 5/1988 | Heaton .................... 144/136 R |

Primary Examiner—W. Donald Bray
Attorney, Agent, or Firm—Mason Fenwick & Lawrence

[57] ABSTRACT

A power tool attachment for table saws comprises a platform to extend the saw table work surface. The power tool attachment has openings to receive bolts extending from an edge of the table of the table saw, so that the power tool attachment may be easily connected and detached from conventional table saws, with the surface of the table and platform coplanar, and with the platform between guide bars of the table saw. A router or other tool is attached to the bottom of the platform so that the tool cutting element extends through a hole in the platform, to engage work placed on the platform surface. A cover is provided for the platform hole when the router or other tool is not in use. The table saw and power tool attachment may be used simultaneously or independently. Flanges project perpendicularly from the periphery of the platform on the power tool attachment to provide greater strength to the platform while reducing its weight. A guide bar, with a recess located in its lower section, is provided to direct workpieces against the cutting elements of tools attached to the platform of the power tool attachment without the guide engaging the cutting elements.

9 Claims, 2 Drawing Sheets

4,887,653

POWER TOOL ATTACHMENT FOR TABLE SAWS

FIELD OF THE INVENTION

This invention relates to a new and improved power tool attachment for table saws.

BACKGROUND OF THE INVENTION

Combining several power tools together in a single machine has been recognized as a way to save space, reduce equipment expenditures, and improve productivity. In addition, the combination of two or more power tools in a single machine may allow the creation of products which could not have been made as easily or as well through the use of the tools on an independent basis. Bragg, U.S. Pat. No. 237,475, discloses a single machine which combines a saw and a router. However, the router can not be easily detached from the machine, and an elaborate mechanism is necessary to direct a workpiece against the saw without contacting the router.

Parts, U.S. Pat. No. 557,222, also discloses plural wood working tools in a single machine. Each of the tools projects through a central metal plate and all tools are driven by a common drive mechanism. A table including a metal plate and wooden side bars is pivoted at one edge.

Skripsky, U.S. Pat. No. 3,734,151, discloses a table of fixed dimensions, and having square openings provided in the table top to receive square base plates, each of which has a power tool attached to it. Finger holes are provided in each of the base plates for removal of the base plate from the table top opening. Since many power tools are quite heavy, it would be difficult to lift them with just the fingers, and they may be dropped. In addition, injury to the user may occur should a body part come in contact with the cutting edge of the work tool projecting from the base plate while searching for a better grip. Further, since the base plate and power tool are located at a distance from the edge of the table, removal of the base plate may cause undue strain to the back of the workman, since the workman must be in an awkward position to reach the base plate. That is, while standing at the edge of the table, the workman must bend forward over the table and extend his arms away from his body in order to reach the finger holes in the base plate in the table. This forces the operator to lift the base plate and attached power tool with his fingers, using the strength of his arms and back, rather than his legs. Further, a fence guide and slidable work guide are provided to guide a workpiece at a desired angle to the face of a saw blade while maintaining its end a measured distance from the blade. Since the surface area of the table top is fixed, the same amount of space is required for a workman to utilize one tool as is required to utilize two tools. In addition, use of only one tool leaves a square opening through the table top into which workpieces may fall.

SUMMARY OF THE INVENTIO

A power tool attachment for a conventional table saw is provided, having a platform to be attached to the table saw to provide a greater work surface area. Attached to the bottom of the platform is a router or other woodworking tool. The platform comprises a plate with peripherally extending flanges which provide stength while reducing weight and permit easy handling. One flange has holes in it to receive bolts projecting from the side edge of the saw table work surface. Nuts may be screwed onto the bolts projecting through the platform flange to firmly attach the power tool attachment to the table saw while extending the saw table work surface.

A hole is provided through the top of the platform to allow a cutting element from the attached tool to project through and above the work surface of the platform. A cover is provided for the hole to provide an extended continuous planar work surface for using the table saw without the power tool of the attachment.

An additional fence guide is provided to direct a workpiece towards or away from the router bit or other cutting element attached to the platform. An opening in the bottom of the fence guide allows the fence guide to pass over the router bit or other tool cutting element extending above the platform surface.

It is an object of this invention to provide a power tool attachment for table saws which is light in weight and easily handled.

A further object of the present invention is the provision of a power tool attachment for table saws which is easily attached and detached from a table saw.

It is another and specific object of this invention to provide a power tool attachment for table saws which enlarges the work surface area.

A still further object of this invention is the provision of a table saw power tool attachment which enlarges the work surface area, and which allows the enlarged work surface area to be used with the saw and the attached power tool simultaneously or individually.

It is a further object of the present invention to provide a fence guide which will avoid impacting upon a cutting element projecting from the power tool attachment.

Other objects, features and advantages of the present invention will be readily apparent from the following description of certain preferred embodiments thereof, taken in conjunction with the accompanying drawings, although variations and modifications may be effected without departing from the spirit and scope of the novel concepts of the disclosure.

DESCRIPTION OF THE PREFERRED EMBODIMENTS

Figure 1:
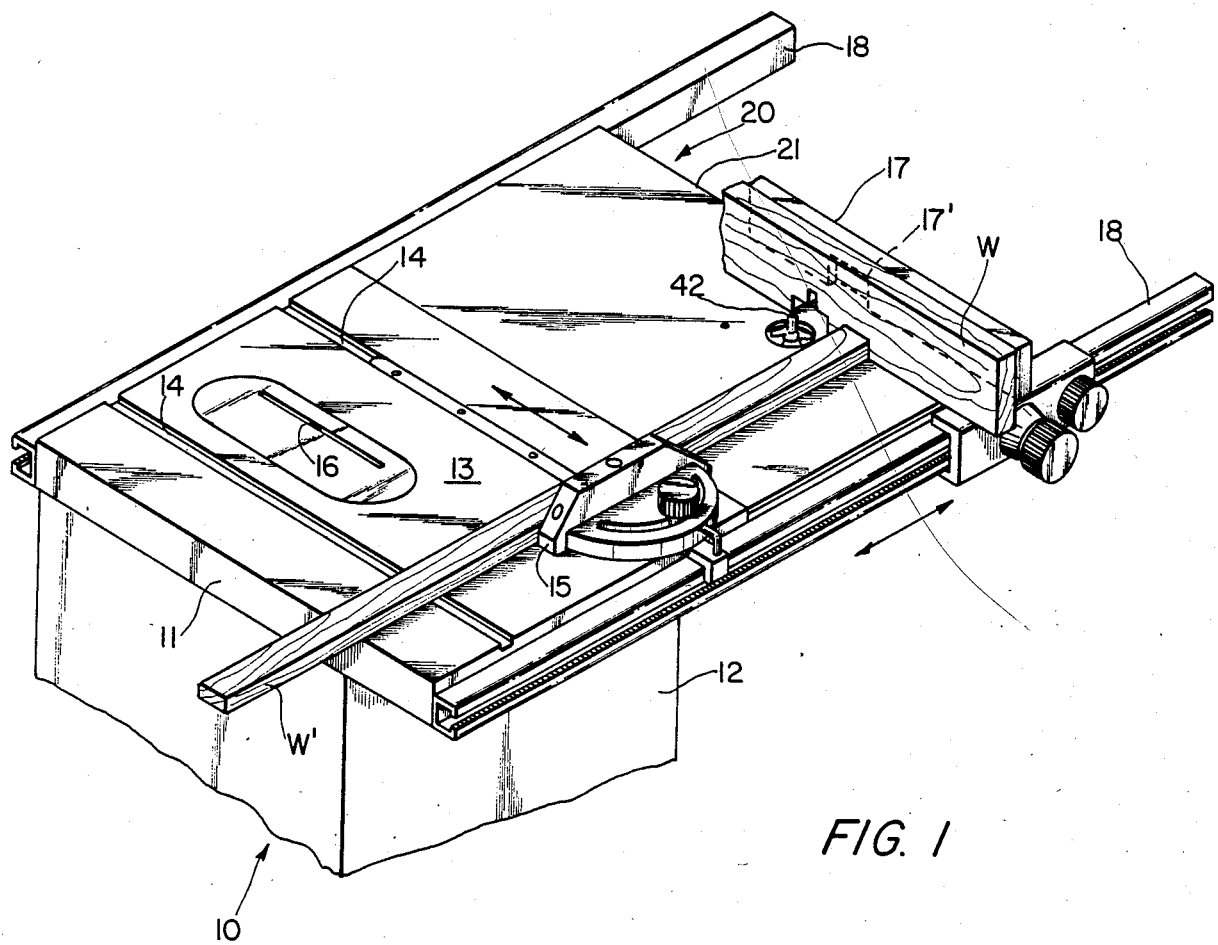
FIG. 1 is a top perspective view of a table saw with a power tool attachment in accordance with the present invention connected to it.

Referring now to the drawings, wherein like or corresponding reference numerals are used for like or corresponding parts throughout the several views, there is shown in FIG. 1 a conventional table saw 10 and a power tool attachment 20 in accordance with the present invention. The table saw 10 comprises a table 11 supported on frame 12 with a saw motor (not shown) within the frame 12. The table 11 has a planar surface 13 with grooves 14 for receiving part of a slidable work guide 15, which includes a protractor. A slot 16 is provided through the table 11 to allow a saw cutting element to project through. Guide bars 18 are attached to table 11 to support and direct a fence guide 17. A recess 17' is provided in the bottom of fence guide 17.

Figure 2:
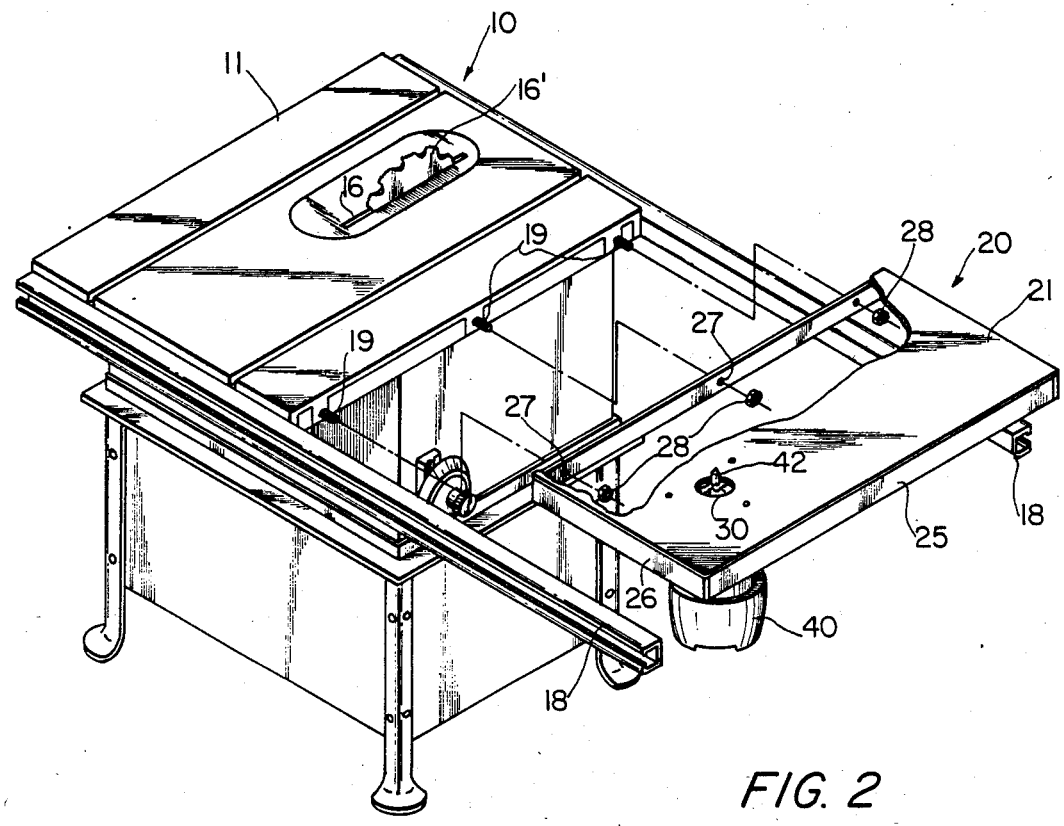
FIG. 2 is an exploded perspective view of a table saw and the power tool attachment of the present invention.

Referring to FIG. 2, there are shown bolts 19 projecting from an edge of the table 11. The power tool attachment 20 of the present invention is shown spaced from the table saw 10. The power tool attachment 20 includes a platform 21 having a top surface 22. A router bit 42 is shown projecting through a hole 30 in the platform 21.

Figure 3:
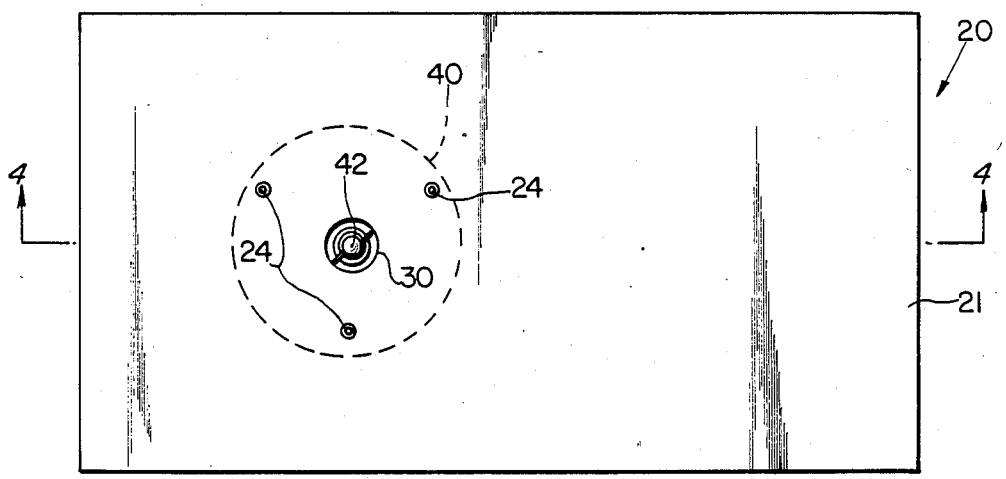
FIG. 3 is a top plan view of the power tool attachment of the present invention.

FIG. 3 is a plan view of the rectangular plaform 21, there being shown hole 30, router bit 42, and the heads of attachment screws 24 for router 40.

Figure 4:
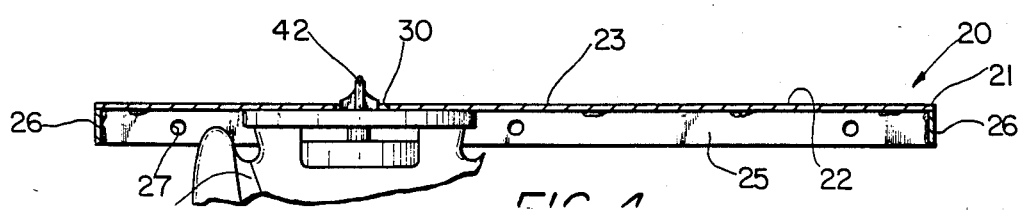
FIG. 4 is a cross sectional view taken along line 4—4 in FIG. 3 with parts in elevation and broken away.

In FIG. 4, which is a cross-sectional view of the platform 21, it will be seen that the platform 21 comprises a flat sheet 23 of which the surface 22 is a part. Depending from the perimeter of the sheet 23 are flanges 25 at the long sides of the sheet 23 and flanges 26 at the narrow ends thereof. One of the flanges 25 is provided with holes 27, of proper size and spacing to receive the bolts 19 which project from an edge of the table 11.

The power tool attachment 20 is connected to the table 11 by the insertion of bolts 19 into holes 27 on the connecting flange 25. Nuts 28 (FIG. 2) may be screwed onto the bolts 19 projecting through holes 27 to firmly hold the flange 25 against the edge of table 11, and to hold the surface 22 coplanar with the surface 13 of the table 11, as shown in FIG. 1. The bolts 19 are sufficiently long that the platform 21 may be supported on them, prior to screwing on the nuts 25.

A router 40 is attached to the bottom of the sheet 23 of platform 21, as by bolts 41 having heads 24. Other woodworking tools may be attached instead of the router 40; the term "woodworking tools" includes all power and other tools which can be used for modifying a variety of materials such as wood, metal or plastic.

Figure 5:
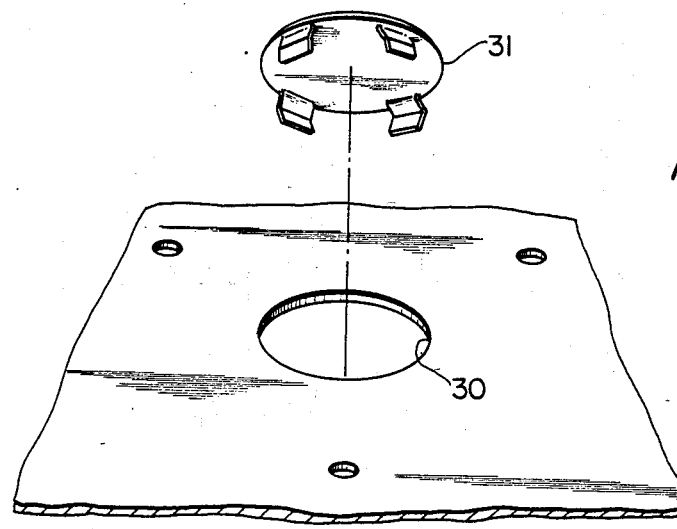
FIG. 5 is an exploded perspective view of a cover and part of the platform of the power tool attachment.

Referring to FIG. 5, a portion of the sheet 23 of the platform 21 is shown, with the hole 30 therein. A cover 31 is shown, for insertion into the hole 30 to provide a continuous surface when the router bit 42 is removed from the hole 30.

Referring again to FIG. 1, the fence guide 17 will be seen to be slidably attached to the guide bars 18. It may move over the surface 22 of the power tool attachment 20, and also over the surface 13 of the table saw 10. Thus, workpieces on the platform 21 may be moved thereover towards the router bit 42. The recess 17' prevents engagement of fence guide 17 with router bit 42. As will be understood, the router bit 42 is removable from the router 40, and consequently the platform 21 may serve the purpose of supporting relatively long workpiecs to be cut by a saw blade 16' (see FIG. 2) extending through the slot 16; fence guide 17 may be used as a guide for a workpiece W on surfaces 22 and 13.

The slidable work guide 15, of known construction, includes a protractor which may change the angle at which the workpiece W' is directed against the saw blade 16' to allow mitre work to be performed. Work guide 15 may be utilized in conjunction with fence guide 17 to control both the length of a workpiece to be cut as well as the angle of the cut. When a router bit 42 projects above platform 21, and fence guide 17 is placed near an end thereof, work guide 15 may be used to push a workpiece along fence guide 17 over the router bit 42 and, provided the workpiece is of sufficient length, against table saw blade 16'. If saw blade 16' is retracted into slot 46 in the table 11, fence guide 17 may be utilized in conjunction with work guide 15 to direct a workpiece W may also be guided by work guide 15 towards the router bit 42.

The platform 21 is of light, but strong construction, due to the relatively light weight sheet 23, with strength provided by the flanges 25 and 26. The router 40 may be readily attached to the platform 21, and be replaced by another tool or tools. To that end, holes as requried may be provided in order to accommodate other power tools, or a common or universal mounting plate may be provided, able to accommodate various power tools.

The platform 21 may be constructed from a variety of materials. In the preferred embodiment, one-eighth inch thick steel is used for the sheet 23, which may be twenty-two inches in width and twelve inches in length. However, these widths and lengths will depend upon the type of table saw to which the platform 21 will be attached, and may also depend upon the individual user's desired work surface needs. The flanges 25 and 26 may be between one-half inch and two inches in height. When the power tool to be attached to platform 21 in a router 40, it is preferred that the opening 30 be seven inches from the flange 25 which is located furthest away from saw blade 16 on the table saw 15. The orifice 30 is preferably located equidistant between the flanges 25.

The power tool attachment 20 serves not only to provide a support for an additional power tool which may be attached and detached from a table saw or the like, but in addition it may provide an enlargement of the available work surface of the conventional table saw, and either or both of the table saw and the router, or other tool, may be used individually, without using the other, or the tools may be used in sequence, or in some instances, simultaneously.

As is readily apparent from the drawings, especially FIGS. 2–4, the router 40 is mounted to platform 21 in a position offset from the center thereof.

The disclosed power tool attachment 20 may be readily lifted, and placed on the bolts 19 extending from the table saw 10, the operator being able to grasp the power tool attachment in both hands along the periphery adjacent the tool mounting, and place in it position, with the bolts 19 entering holes 27, after which the nuts 28 are put in place while being supported only or primarily by bolts 19. To remove the power tool attachment 20 from the table saw 15, it is only necessary to reverse the process, the operator at all times being able to readily support the power tool attachment 20 and to remove it from the table saw 10 and transport it to a desired location without significant or undue strain. The workman may stand adjacent a guide bar 18, or at the ends of the guide bars 18. Consequently, the power tool attachment 20 may be held relatively close to the body of the operator at all times, for attachment to or after it has been detected from the table saw 10. The operator is enabled by the construction of the power tool attachment 20 to have a firm grip on it with both hands, thereby resulting in minimal risk of harm to the operator, or to the router or other tool, which would result from inadvertently dropping the power tool attachment 20. As will be apparent, other attachment means may be provided than those specifically shown, although the hereinabove disclosed embodiment is preferred because of the prevalence of table saws as herein disclosed, in which bolts extend from an edge of the table.

The claims and the specification describe the invention presented, and the terms that are employed in the claims draw their meaning from the use of such terms in the specification. Some terms employed in the prior art may be broader in meaning than specifically employed herein. Whenever there is a question between the broader definition of such term as used in the prior art and the more specific use of the term herein, the more specific meaning is meant.

I claim:

1. In combination with a table saw comprising a table with a first work surface defining a first work area and an edge, a support for said table, a plurality of linear elements projecting from said edge, and a saw carried by said table having a cutting blade adjustable between an operative position above said table and an inoperative position beneath said table, a removable power tool attachment comprising:
    a platform having a second work surface defining a second work area,
    means on said platform for removably connecting said platform to said linear elements projecting from said edge of said table,
    means on said platform for attaching a power tool thereto, and
    a power tool on said platform supported by said attaching means,
    whereby a workman may use said power tool attachment only to enlarge said first work area by said second work area to accommodate large workpieces, or may use said saw and said power tool in sequence or simultaneously without having to remove and replace said saw or said power tool.

2. The combination according to claim 1, wherein:
    said connecting means comprises means on said platform for receiving said linear elements.

3. The combination according to claim 2, wherein:
    said platform is a substantially flat sheet, with flanges projecting from the periphery of said sheet 4. The combination according to claim 3, wherein:
    one of said flanges comprise receiving means for said linear elements.

5. The combination according to claim 1, wherein said attaching means supports said power tool below said platform, a hole in said platform, and a cutting element of said power tool projecting through said hole.

6. The combination according to claim 5, said cutting element being removable, and further comprising a cover for said hole, whereby said sheet will have a substantially continuous surface.

7. The combination according to claim 5, further comprising:
    a fence guide connected to said power tool attachment, and
    a recess in the bottom of said fence guide,
    whereby said fence guide will pass over said cutting element without contacting said cutting element.

8. In combination with a table saw comprising a table having a work surface defining a work area and an edge, a support for said table, a plurality of linear elements projecting from said edge, a saw carried by said table having a cutting blade adjustable between an operative position above said table and an inoperative position beneath said table, and a pair of spaced guide bars extending perpendicularly to said edge,
    a removable table tool attachment comprising:
    a platform having means thereon for receiving said linear elements, a center, and a periphery, means for removably connecting said platform to said linear elements projecting from said edge of said table with said platform extending substantially between said guide bars, and with the upper surface thereof substantially coplanar with the upper surface of the table of said table saw,
    means on said platform for attaching a power tool thereto at a location removed from the center thereof, and
    a power tool on said platform supported by said attaching means relatively close to a said guide bar during assembly of said attachment to said table saw,
    whereby a workman may use said power tool attachment only to enlarge said work area to accommodate large workpieces for either said saw or said power tool or may use said saw and said power tool in sequence or simultaneously without having to remove and replace said saw or said power tool, and whereby the workman may stand closely adjacent said platform and grip said platform along said portions of said periphery relatively close to said power tool, for placing said attachment on said table and removing said saw when standing either adjacent one said guide bar, or at the ends thereof, thereby reducing the chances of injury or dropping the power tool.

9. The combination of claim 8, said linear elements comprising bolts, and said bolts being sufficiently long to support said power tool attachment when said power tool attachment is spaced from said edge of said table.

* * * * *